Patented June 28, 1949

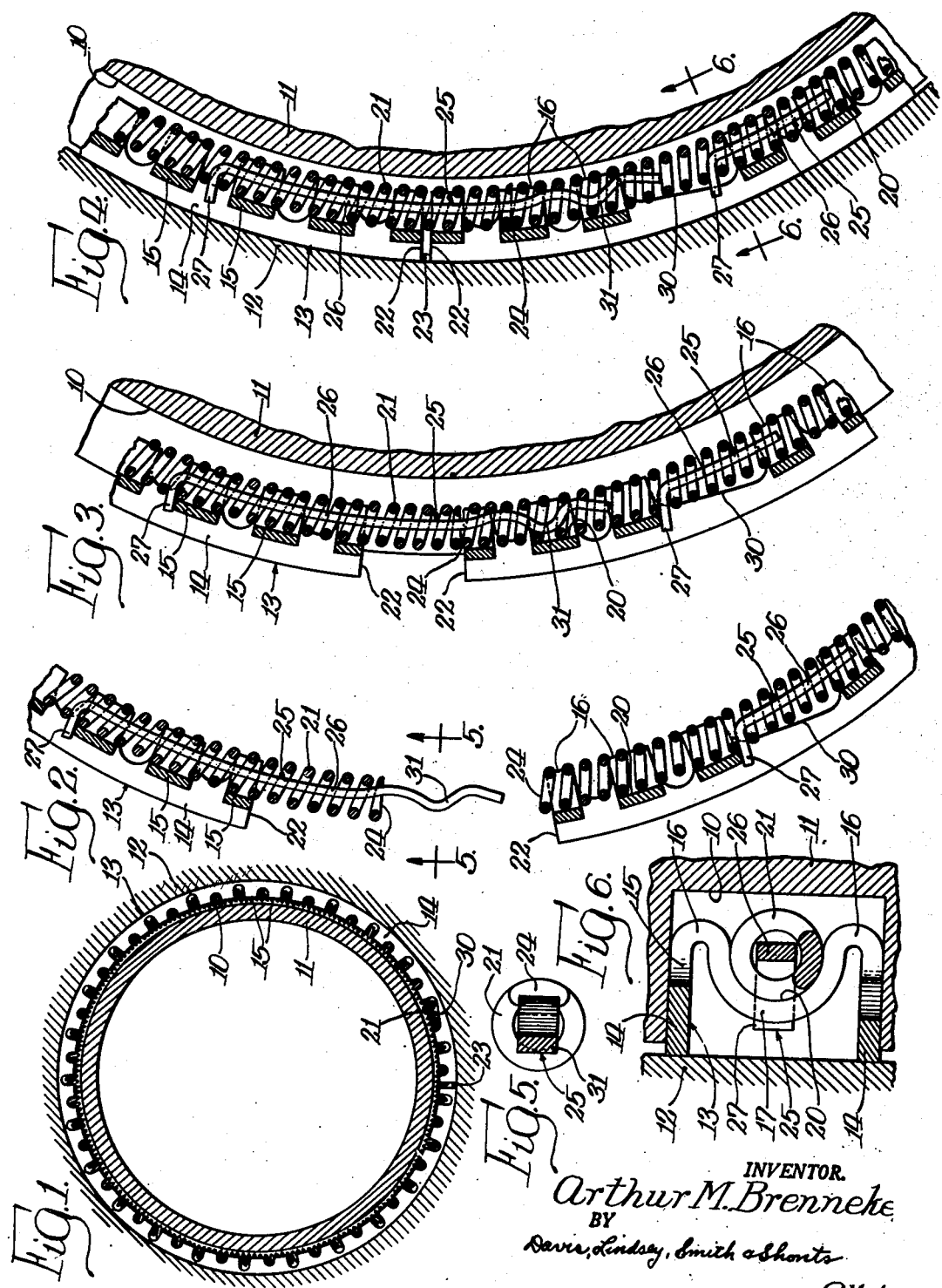

2,474,413

UNITED STATES PATENT OFFICE 2,474,413

PISTON RING

Arthur M. Brenneke, New Castle, Ind., assignor to Perfect Circle Corporation, a corporation of Indiana Application January 2, 1947, Serial No. 719,788

12 Claims. (Cl. 309—29)

The invention relates generally to piston rings and more particularly to a piston ring for use in an internal combustion engine.

The general object of the invention is to provide a novel piston ring assembly comprising a ring member and a spring which is so compressed when in the cylinder that it exerts a large expanding pressure on the ring member, with the spring held under partial compression, when the ring is out of the cylinder, in such a manner that the spring will not expand the ring member beyond such size as is necessary to retain the latter within its groove in the piston.

Another object is to provide a piston ring assembly of the character mentioned in the foregoing object and arranged so that the ring assembly may be manually expanded beyond the above-mentioned size so that it may be readily mounted upon and removed from the piston.

A further object is to provide a ring assembly of the foregoing character, which is provided with means to align the ends of the spring when the ring slips into the piston groove and the ends of the ring move toward each other, and to detachably latch the ends of the spring together.

Other objects and advantages will become apparent from the following description taken in connection with the accompanying drawings, in which:

Figure 1 is a fragmentary sectional view of a piston and cylinder, taken in a plane perpendicular to the axis thereof through one of the ring grooves of the piston with a ring positioned in said groove and embodying the features of the invention.

Fig. 2 is an enlarged fragmentary sectional view of the ring when expanded to slip over the piston.

Fig. 3 is a view similar to Fig. 2 but showing the ring positioned in the piston groove before the piston is inserted in the cylinder.

Fig. 4 is view similar to Figs. 2 and 3 but showing the ring and piston positioned within the cylinder.

Fig. 5 is a sectional view, on a still larger scale, taken on the line 5—5 of Fig. 2.

Fig. 6 is a sectional view taken on the line 6—6 of Fig. 4.

A ring embodying the features of the invention is herein illustrated in a form adapted for use in an internal combustion engine. Thus, the ring is shown as being mounted in a groove 10 provided in a piston 11 mounted for reciprocation in a cylinder 12. The ring structure is of the character shown in the copending application of Ralph R. Teetor, Serial No. 541,334, filing date June 21, 1944 now Patent No. 2,452,503. This type of ring comprises a ring member, indicated generally at 13, formed from a strip of sheet metal and having a pair of cylinder-engaging flanges 14 spaced from each other axially of the piston 11. The two flanges 14 are connected by circumferentially spaced webs 15 which extend inwardly from the flange 14 and are reversely bent as at 16 (see Fig. 6) to curve outwardly as at 17 to provide an inwardly facing groove 20. Seated in the groove 20 is a means for expanding the ring member, comprising in the present instance a coiled spring 21. The latter has a diameter fitting snugly within the groove 20 but with sufficient play so that the turns of the spring may freely shift circumferentially of the ring member upon expanding or contracting.

In making a ring member of this character, a flat strip of sheet metal is utilized, and transversely extending slots are punched therein to provide the spaces between the webs 15. The strip is then bent to provide the cross-sectional form shown in Fig. 6 and is curved to fit about the piston. In the form herein shown, the slots which provide the spaces between the webs 15 are all of equal length transversely of the strip but are in a staggered relation to each other so that one slot is closer to one edge of the strip than to the other edge, while the next slot is closer to said other edge than to said one edge. Thus, in the finished ring member, alternate slots in one flange are closer to the edge of the flange than the intervening slots, while the same arrangement is true of the other flange but in staggered relation to the one flange.

The ring member 13, when made from a strip as above described, thus is provided with ends 22 which, when the ring is compressed within the cylinder 12, leaves a gap 23 (see Fig. 4) between the ends. The spring 21, being of coiled construction, also has ends 24 which are adapted to abut each other, and when the ring is within the cylinder, the spring is thereby compressed to exert an expanding pressure on the ring member 13 and thus hold the flanges 14 in engagement with the cylinder wall.

To facilitate installing a piston ring, it is desirable that the ring, when out of the cylinder, will tend to maintain an inside diameter which is less than the outside diameter of the piston. If the spring 21 were permitted to expand the ring beyond such size, the ring would fall out of its groove in the piston and it would, therefore, be quite difficult to place the pistons in the cylinder block with the rings properly assembled. However, if the spring 21 be so constructed that it is fully expanded when the ring has an inside diameter slight less than the piston diameter so that the ring would not fall out of its groove, the spring would be compressed only a relatively small amount when the piston is placed in the cylinder. Such compression would exert insufficient expanding pressure on the ring member for the latter to function properly.

The present invention provides a ring in which the spring 21 is prevented from expanding the ring member 13 beyond such size as is necessary to hold the ring within its groove, but the spring is capable of exerting a sufficiently large expanding pressure on the ring member, when in the cylinder, to cause the ring member to function properly. To this end, the spring 21 is held under partial compression, when out of the cylinder, without expanding the ring member 13 beyond the diameter necessary for it to remain in the piston groove. With the further compression imposed upon the spring when the ring is confined within the cylinder, the desired expansive pressure of the spring on the ring member is attained.

In the present instance, means is provided for engaging the spring 21 adjacent its ends and holding the intermediate or major portion of the spring under compression. Said means, as herein shown, comprises a pair of retainers, indicated at 25, preferably formed of wire having a rectangular cross section, and each comprising a portion 26 extending circumferentially within the spring, and a hook portion 27 extending generally radially of the ring between turns of the springs and into engagement with one of the webs 15 of the ring member. In the arrangement shown in the drawings, the portion 26 of the retainer in the lower end of the spring as viewed in Figs. 2, 3 and 4, extends away from the end of the spring, while the portion 26 of the other retainer extends from the hook portion 27 toward the end of the spring. The retainers 25, by hooking the spring to the ring member adjacent the ends, thus can hold the intermediate portion of the spring under compression without the spring tending to cause the ends 22 of the ring member to separate farther than a desired distance. The ring, therefore, will remain in its groove when once placed therein. The ring, however, can, of course, be expanded manually to sufficient extent to permit it to be slipped over the end of the piston.

When the ring and piston are inserted in the cylinder, the spring is still further compressed, since the ends 24 of the spring abut each other. Thus, the spring is compressed sufficiently to exert a relatively large expanding pressure on the ring, when confined within the cylinder, so that the flanges 14 of the ring member bear with sufficient pressure against the cylinder wall. To permit the expanding pressure of the spring to act freely on the ring under such conditions, the further compression of the spring causes the retainers 25 to shift out of engagement with webs 15 so that the spring is then free to act as though the retainers were not present. To provide for shifting movement of the spring without restraint by the retainers, a web adjacent the hooked portion 27 of one of the retainers is removed. Thus, as indicated at 30 in Figs. 2, 3 and 4, a web is cut away to give adjacent hooked portion 27 a wide range of movement when the spring is compressed.

In the present construction, one of the retainers 25 is constructed to perform additional functions, namely, aligning the two ends of the spring so that they will properly abut under compression, and detachably latching the two ends together so that they can not be inadvertently separated after placing the ring in its groove. To this end, the retainer, which extends toward the end of the spring (the upper retainer as viewed in Figs. 2, 3 and 4) projects beyond the end of the spring as shown in Fig. 2, and is adapted to enter the other end of the spring, as shown in Figs. 3 and 4, thus holding the two ends in alignment. The latching of the two ends of the spring is also effected by such projecting portion. For this purpose, the projecting portion is bent into a sinuous form, as indicated at 31, and the bends thereof frictionally engage between the turns of the spring. The bent portion 31 thus holds the two ends of the spring together but permits their separation by a slight pull.

With the foregoing construction, the spring 21 is capable of exerting a substantial expanding pressure on the ring member 13, when confined within the cylinder. However, when the ring and piston are out of the cylinder, the spring does not expand the ring member beyond the diameter necessary to hold it within its groove in the piston. The bent end 31 of the one retainer aligns the ends of the spring when the ring is placed in the groove and detachably holds the ends together against accidental displacement.

I claim:

1. A piston ring comprising a ring member having a gap, a spring positioned within said ring member and bearing radially outwardly thereon to expand said ring member, and means for holding said spring under load without expanding the ring member beyond a predetermined size when out of the cylinder, whereby said spring will exert a large expansive force on said ring member when confined within the cylinder, said means being operable to hold said spring under said load irrespective of the width of the gap in the ring member.

2. A piston ring comprising a ring member having a gap and constructed to provide a groove in its inner edge, a coil spring seated in said groove and bearing radially against the ring to expand it, and means for holding said spring under compression when the ring is out of the cylinder to prevent the spring from expanding the ring member beyond a predetermined size but permitting expansion of the ring member beyond said size without altering the compression of the spring, said spring being adapted to be further compressed by confining the ring in the cylinder.

3. A piston ring comprising a ring member having a gap and constructed to provide a groove in its inner edge, a coil spring seated in said groove, and means engaging said ring member and said spring adjacent their ends for holding said spring under compression when the ring is out of the cylinder, the ends of the spring being in abutment with each other and said means being shiftable away from the ends of the ring so that the spring will be further compressed when the ring is confined within the cylinder and thereby exert a large expansive force on the ring member, said means preventing said spring from expanding said ring member beyond a predetermined size when the ring is out of the cylinder.

4. A piston ring comprising a ring member having a gap and comprising a pair of spaced cylinder-engaging flanges interconnected by circumferentially spaced webs, a coil spring seated against said webs, and a pair of retainers engaging turns of the spring and webs adjacent the ends of the ring member and spring to hold the spring under compression when the ring is out of the cylinder, at least one of said retainers being shiftable relative to said ring member to permit further compression of the spring when the ring is confined within the cylinder.

5. A piston ring comprising a ring member having a gap and comprising a pair of spaced cylinder-engaging flanges interconnected by circumferentially spaced webs, a coil spring seated against said webs, and a pair of retainers engaging turns of the spring and webs adjacent the ends of the ring member and spring to hold the spring under compression when the ring is out of the cylinder, the space between the web engaged by one of said retainers and the adjacent web being elongated to permit the retainer to shift relative to the ring member and thereby permit the spring to be further compressed when the ring is placed within the cylinder.

6. A piston ring comprising a ring member having a gap and comprising a pair of spaced cylinder-engaging flanges interconnected by circumferentially spaced webs, a coil spring seated against said webs, and a pair of retainers each comprising a portion lying within the spring and a portion extending radially of the ring between turns of the spring and into engagement with a web adjacent one end of the ring member to hold the spring under compression when the ring is out of the cylinder, one of said retainers being circumferentially shiftable relative to the ring member to permit further compression of the spring when the ring is placed within the cylinder.

7. A piston ring comprising a ring member having a gap and comprising a pair of spaced cylinder-engaging flanges interconnected by circumferentially spaced webs, a coil spring seated against said webs, and a pair of retainers each engaging a turn of the spring and a web adjacent one end of the ring member to hold the spring under compression when the ring is out of the cylinder, one of said retainers being circumferentially shiftable relative to the ring member to permit further compression of the spring when the ring is placed within the cylinder, and one of said retainers having a portion extending beyond the end of the spring in which it is located and adapted to enter the other end of the spring to hold the two ends in alignment.

8. A piston ring comprising a ring member having a gap and comprising a pair of spaced cylinder-engaging flanges interconnected by circumferentially spaced webs, a coil spring seated against said webs, and a pair of retainers each engaging a turn of the spring and a web adjacent one end of the ring member to hold the spring under compression when the ring is out of the cylinder, one of said retainers being circumferentially shiftable relative to the ring member to permit further compression of the spring when the ring is placed within the cylinder, and the other of said retainers having a portion extending beyond the end of the spring in which it is located and adapted to enter and frictionally engage the other end of the spring to align the two ends of the spring and hold them in abutting relation.

9. A piston ring comprising a ring member having a gap and comprising a pair of spaced cylinder-engaging flanges interconnected by circumferentially spaced webs, a coil spring seated against said webs, and a pair of retainers each comprising a portion extending radially of the ring between turns of the spring and to engage a web adjacent one end of the ring when the ring is out of the cylinder and a portion extending circumferentially of the ring within the spring to hold the spring under compression when the ring is out of the cylinder, the last-mentioned portion of one of said retainers extending beyond the end of the spring to enter the other end thereof for aligning said ends and being bent at its end to frictionally engage turns of the spring and hold the ends thereof in abutting relation, the space between adjacent web members permitting the first-mentioned portions to shift circumferentially of the ring member when the latter is compressed.

10. A piston ring comprising a ring member having a gap, a spring positioned within said ring member, and means for holding said spring under initial compression, when the ring is out of the cylinder, without expanding the ring member beyond a predetermined size, said ring member when confined within the cylinder placing the spring under further compression, said means engaging the spring at the respective sides of the gap and bearing against the spring in a direction away from said gap to maintain said spring under said initial compression when the ring member is expanded beyond said predetermined size for placing it on the piston.

11. A piston ring comprising a ring member having a gap, an elongated spring positioned within said ring member with its ends adjacent the ends of the ring member and extending substantially for the full length of the ring member in a circumferential direction, and means engaging the spring adjacent its ends for holding said spring under compression, when the ring is out of the cylinder, without causing the spring to expand the ring member beyond a predetermined size and holding said spring so compressed when the ring member is expanded beyond said size, said ring member when confined within the cylinder holding the spring under further compression.

12. A piston ring comprising an expansible ring member, a spring positioned within the ring member for expanding the latter and extending circumferentially of the ring member for substantially the full length thereof, and means engaging the spring for holding said spring under compression, when the ring is out of the cylinder, without expanding the ring member beyond a predetermined size but permitting expansion of the ring member beyond such size without altering the compression of the spring, said ring member when confined within the cylinder holding the spring under further compression.

ARTHUR M. BRENNEKE.

REFERENCES CITED

The following references are of record in the file of this patent:

UNITED STATES PATENTS

| Number | Name | Date |
| --- | --- | --- |
| 1,767,711 | Solenberger | June 24, 1930 |
| 1,963,151 | Russell | June 19, 1934 |

FOREIGN PATENTS

| Number | Country | Date |
| --- | --- | --- |
| 17,748 | Great Britain | Oct. 6, 1900 |